US012810054B2

(12) United States Patent
Wippich et al.

(10) Patent No.: US 12,810,054 B2
(45) Date of Patent: Nov. 24, 2026

(54) COMPUTER-ASSISTED INTERACTIVE CONTENT PRESENTATION AND REAL-TIME ASSISTANCE

(71) Applicant: DIGITAL MEDIA INNOVATIONS, LLC, Omaha, NE (US)

(72) Inventors: David John Wippich, San Jose, CA (US); Michael Krax, Boston, MA (US); Earl Hooper, Portland, OR (US)

(73) Assignee: DIGITAL MEDIA INNOVATIONS, LLC, Omaha, NE (US)

( * ) Notice: Subject to any disclaimer, the term of this patent is extended or adjusted under 35 U.S.C. 154(b) by 479 days.

(21) Appl. No.: 18/452,408

(22) Filed: Aug. 18, 2023

(65) Prior Publication Data

US 2025/0061270 A1 Feb. 20, 2025

(51) Int. Cl.

*G06F 40/166* (2020.01)
*G06F 40/30* (2020.01)
*G06F 40/40* (2020.01)

(52) U.S. Cl.

CPC ............ *G06F 40/166* (2020.01); *G06F 40/30* (2020.01); *G06F 40/40* (2020.01)

(58) Field of Classification Search

CPC ........ G06F 40/166; G06F 40/30; G06F 40/40; G06Q 10/10

See application file for complete search history.

(56) References Cited

U.S. PATENT DOCUMENTS

| | | | | |
|---|---|---|---|---|
| 12,135,937 | B1 * | 11/2024 | Mancuso | G06F 40/20 |
| 2018/0116599 | A1 * | 5/2018 | Bastide | A61B 5/1112 |
| 2018/0122371 | A1 * | 5/2018 | Vangala | G10L 15/22 |
| 2019/0341050 | A1 * | 11/2019 | Diamant | G06V 40/172 |
| 2020/0050700 | A1 * | 2/2020 | Rakshit | G06Q 10/42 |
| 2021/0117929 | A1 * | 4/2021 | Lewbel | H04L 12/1822 |
| 2022/0405630 | A1 * | 12/2022 | Harrison | G06N 20/00 |
| 2023/0061210 | A1 * | 3/2023 | Gordan | G06F 40/40 |
| 2023/0162733 | A1 * | 5/2023 | Moorsom | G10L 25/57<br>348/14.07 |

(Continued)

*Primary Examiner* — Irete F Ehichioya
*Assistant Examiner* — Phoebe X Pan
(74) *Attorney, Agent, or Firm* — PATENT CAPITAL GROUP

(57) ABSTRACT

A presentation assistance system receives information about a presentation to be given and automatically provides feedback to improve the presentation either offline or in real time as the presentation unfolds using computer models, where a presentation is a collection of multi-media content, including but not limited to text, slides and graphics, and audio and video streams. The computer models may be trained based on prior presentations and performance metrics of relevant entities. In particular, the presentation includes interactions with audience members and computer models are used to generate likely participants and related interactions, such as questions or recommendations for improved interactions, relevant to the current presentation based on a set of machine learning and AI models, and, in particular, language models. The language model may be prompted with prior relevant questions to determine questions for the current presentation and evaluate the likelihood that the current presentation effectively answers them.

20 Claims, 3 Drawing Sheets

(56) References Cited

U.S. PATENT DOCUMENTS

| | | | | |
|---|---|---|---|---|
| 2023/0214876 | A1* | 7/2023 | Raush | G06Q 30/0277 705/14.42 |
| 2023/0261894 | A1* | 8/2023 | Srivastava | H04L 12/1831 709/204 |
| 2023/0385740 | A1* | 11/2023 | Karlberg | G06Q 10/0639 |
| 2024/0371089 | A1* | 11/2024 | Yang | G06F 16/4393 |

* cited by examiner

COMPUTER-ASSISTED INTERACTIVE CONTENT PRESENTATION AND REAL-TIME ASSISTANCE

BACKGROUND

This disclosure relates generally to automated presentation advice, and particularly to applying language models to improve presentations with interaction predictions.

In many circumstances, information is related to an audience in a real-time presentation that may significantly affect how the information is received. Such real-time presentations may include press releases, corporate financial reports, political speeches, and so forth. Audience participants may be affected by the tone, word choice, presentation style, and other aspects of the presentation. In addition, for many types of high-stakes presentations, the presentation may also be automatically analyzed and used in downstream processes, resulting in media coverage or other decisions based on the presentation. For example, information in the presentation may be automatically summarized and inform published articles, television or print coverage, or investor actions. In addition, many types of presentations may also include interactions with external participants (such as a question and answer) with unknown content that may be beneficial or challenging to the presenter. In addition, advice and coaching for such presentations has typically not been effectively performed by automated means or incorporated computer model processing.

As one example of such presentations, publicly traded companies may present financial performance in an earnings webcast or conference call once per quarter. These events are typically accompanied by an earnings press release or other regulatory filing. In addition, external participants such as financial analysts or prominent stockholders may pose questions to be answered by the company. Moreover, information and quotes from the presentation may appear in secondary sources and the presentation may affect subsequent stock performance and investor sentiment. As such, these presentations may be public, high-stakes, include significant uncertainty with respect to the types of questions that may be received from participants, and have far-reaching effects. A well-prepared earnings webcast or call, presented with confidence, honesty, and accuracy, can make a company well positioned for fluid market conditions. Being prepared for all potential questions and anticipating the 'hard ball' questions can sometimes make or break how a company performs once trading resumes. This is especially true in current market dynamics with the emergence of the retail investor and with automated computer analysis of investor presentations. In this environment, automated optimization of the presentation with an eye towards the potential impact on investor sentiment and in view of the unknown participant questions is a particular challenge.

SUMMARY

A presentation assistance system analyzes presentations at multiple stages of preparation and delivery with one or more computer models. The presentation assistance system collects data for, maintains, and trains computer models related to improving presentations at various stages, including planned script development, rehearsal, and delivery. The presentation assistance system assembles a database of previously-presented presentations and generates additional data describing/annotating the presentations across various dimensions. Such substantive aspects of the presentation, such as its key points, a summary, themes, and topics, along with identification of participants and the respective interactions from those participants and the topics and other information contained in the interactions. Additional interpretations may also be generated related to tone/sentiment, along with additional non-verbal information such as delivery style. As such, existing and new presentations are processed and the content analyzed to generate summaries, key facts, and extracts of questions and answers (as types of interactions) while ensuring the correct attribution of speakers. In addition, the further information may include sentiment analysis and grading on the calls, questions and answers, building a comprehensive database of such presentations and their analytics.

The various information about presentations may also be provided to users and navigable in with various data visualization interfaces. This creates a visual representation of the metadata generated by the information extraction module, including performance of past presentations and thus enabling post-call analytics, recommendations, and quality improvement tracking as the user navigates the visualization interfaces.

The presentation assistance system uses the historical presentation data and its related information with computer models to operate as a sophisticated copilot or coach to a user preparing and delivering a presentation. The user may provide presentation materials, including a presentation script as a presentation is being prepared and rehearse its presentation. The script and related presentation are analyzed with respect to the information analysis and used to automatically determine revisions that improve the terms, tone, themes, presentation style, and other aspects of the presentation in view of the previous presentations and in view of the effect of such modifications on related performance data of those presentations.

In addition, based on the analysis of the presentation and determined characteristics of the presentation, the presentation assistance system may automatically generate predicted participants and likely interactions that may occur, enabling the user to prepare for these likely interactions (e.g., audience questions), for example by addressing the interactions in the script or preparing potential responses and avoiding surprise. To do so, the determined characteristics of the presentation are used to identify relevant external interactions from other historical interactions using the interactions and topics of historical presentations and associated interpretations thereof. That is, the information about the presentation (e.g., identified topics or a summary of the presentation) and the extracted information about interactions in previous presentations (e.g., topics associated with other presentations) are used to identify which interactions from prior presentations are most relevant. The particular text of the interactions (e.g., the specific questions asked) may then be used to generate a prompt to a language model for predicting likely interactions with the current presentation. As such, the language model may generate potential questions that are informed by a limited group of relevant prior interactions. As the identified interactions may be specifically identified for the particular presentation, they may be directly included in the input to the model, enabling the model to more effectively apply the interactions in generating possible interactions for the current presentation. The predicted interactions may then be used to generate modifications of the current presentation that account for or address the interactions. The likely interactions and potential modifications to address them may then be automatically applied to the presentation script and/or provided to the user for consideration.

As such, the analysis of a presentation in development, such as prepared remarks (written) and any pre-recorded audio clips and/or videos, are processed to provide users with a report on how AI models may summarize the key facts, information on emotion detection by AI, as well as a set of predicted questions by participants. Similarly, communication style and body language are analyzed to provide feedback for improving delivery of the presentation with the desired style.

Finally, these analyses and insights may also be incorporated with real-time delivery of the presentation, such that the current script, presentation style, and so forth may be analyzed as the presentation unfolds and advice may be presented to the user for revision as it proceeds. As audience members join or participate, the advice may be modified to account for the changed circumstances. Likewise, when a participant provides an interaction, such as a question, the question may be evaluated with respect to the previously predicted questions and used to surface relevant information for responding to the question in the desired way. As such, the system also provides real-time guidance and advice for predicting and responding to external questions.

Together, this system enables collection and use of historical presentation information to train computer models that ascertain what questions are likely to be asked by attendees and which content and speaker attributes lead to successful presentations, so that any pre-recordings or prepared statements can be adjusted to maximize effectiveness of content delivery and the related insights can also benefit real-time delivery of the presentation.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Presentation Overview

Figure 1:
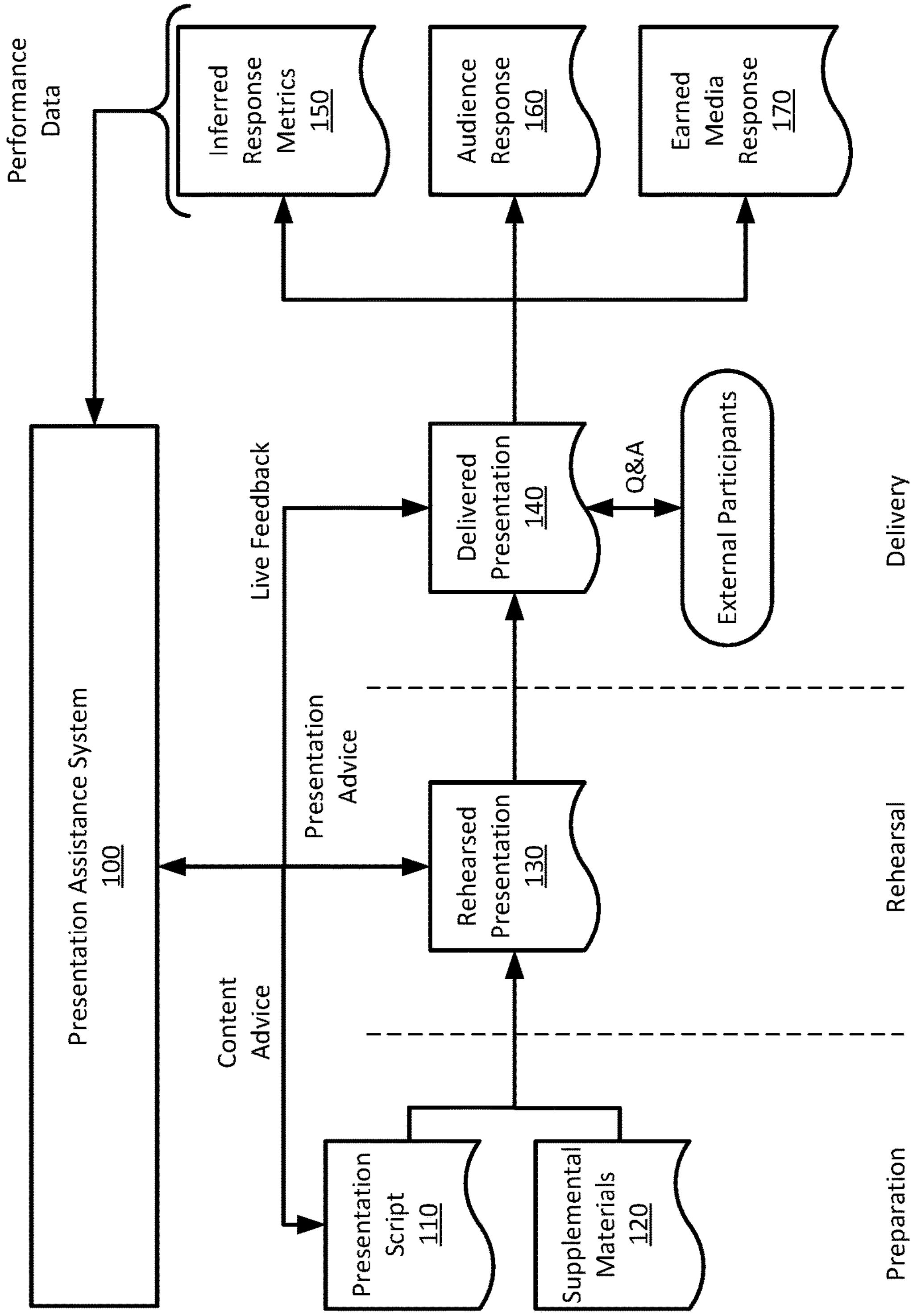
FIG. 1 illustrates interactions of a presentation assistance system during the development and deployment of a delivered presentation, according to one or more embodiments.

FIG. 1 illustrates interactions of a presentation assistance system 100 during the development and deployment of a delivered presentation, according to one or more embodiments. In many cases, information may be conveyed to audiences in a live presentation. Broadly, the user(s) preparing and/or presenting the material may engage in several phases: preparing the material, rehearsing the presentation, and delivering the presentation. The presentation assistance system 100 may provide advice, recommendations, and modifications to the presentation at each of these phases. The presentation may be based on a presentation script 110 and additional supplemental materials 120. The presentation script 110 includes the text to be presented and may include annotations that are not intended as spoken aspects of the presentation script 110. Such annotations may include supplemental information about the script, such as topic headers, and cues describing how to present particular portions of the script, such as instructions to pause, express an emotion or facial expression, transitions and/or references to supplemental materials 120 or other directions for delivery or "performance" of the presentation 140. The supplemental materials 120 may include content included in the presentation, such as audio, video, or presentation slides, or materials that may be released or distributed contemporaneously with the delivered presentation. In some embodiments, the supplemental materials may include related disclosures and other released information; in the financial earnings context, these may include documents distributed to investors (e.g., separate from the presentation) or regulatory filings such as Form 10-K and Form 10-Q. The presentation assistance system 100 provides automated review, advice, and revision to the presentation to improve the quality of the presentation, particularly with respect to various types of performance data as discussed below.

The example presentations discussed herein generally relate to presentations related to delivery of financial results, such as a quarterly earnings call or report related to public company. The delivered presentation may include, for example, quarterly earnings webcasts, conference calls, press releases (and associated presentations). These types of presentations may have significant effects on the company and may affect the company's future financial performance, such that small differences in the particular words, tone, and messaging from the company may have outsized future effects. In addition, while human interpretations of the presentation continue to play an important role, in this context, many presentations may be automatically analyzed by other computing systems and used to drive further time-sensitive decision-making, such that missteps in the presentation delivery may be automatically analyzed and affect further behaviors. Meanwhile, delivery of the presentations typically remain driven by human users who may be intelligently advised by the presentation assistance system 100. As such, the presentation assistance system 100 may be applied generally to additional contexts in which presentations are prepared and delivered (e.g., with unknown external participants and with significant performance data that may inform analysis by the presentation assistance system 100), and the particular types of data discussed herein relating to financial presentations are examples only.

After developing the presentation script 110, the user presenting the script may proceed to practice the presentation to generate a rehearsed presentation 130 that may also be analyzed by the presentation assistance system 100 before a delivered presentation 140 is given to the audience. During the delivered presentation, one or more external participants may participate to provide a number of external interactions, such as a question and answer, related to the presentation. For example, the presenting user may solicit questions from external participants answer them. The external participants generally represent entities with different interests than the presenter of the delivered presentation 140, such that the external participants generally do not participate in the preparation of the presentation and may present questions or other interactions that will not necessarily be supportive of the presentation, such as probing or critical questions that may challenge the presenter or the content of the presentation. In other examples, the external participants, while not antagonistic, may pose questions different from the current subject matter of the presentation. For example, when the presentation relates to the delivery of financial results or other commentary related to a public company, an external participant may pose questions related to the developments in the company's field as a whole or the impacts of issues that may appear unrelated to the immediate content of the prepared presentation (e.g., questions about recent global developments, overall economic climate, changing interest rate effects on the company, and so forth). In many cases, the particular participants (who may participate with associated interactions) attending a presentation may be at least partially unknown before the live presentation is delivered and, in some cases, may be unknown until actual participation in the presentation (e.g., a participant on a conference call who participates only when questions may be presented).

In addition to the content and delivery of the presentation materials, the particular interactions from the external participants and how they are addressed in the presentation may also have a significant impact on the related downstream performance of the presentation with respect to relevant performance data. Such performance data may vary according to the particular information of interest to a particular type of presentation and the configuration of the presentation assistance system 100. In general, the performance data represents measurable data that may be analyzed to determine whether the presentation was effective. The performance data may be measured and collected by the presentation assistance system 100 and used to inform the advice and feedback generated by its models. As examples, performance data may include inferred response metrics 150, audience responses 160, and earned media responses 170.

The audience response 160 represents measurable evaluations of the presentation by an audience, such as a portion of the persons who viewed the presentation as it was delivered and may include ratings or positive/negative evaluations of the presentation. The earned media response 170 represents data related to further distribution of information about the presentation as disseminated by additional entities, such as media companies, websites, social media platforms, and other entities. Such earned media may include mentions, references or links, quotes, and other information related to the delivered presentation. The particular information disseminated by other entities may also be evaluated to determine the general character and tone of the earned media response 170. For example, for a financial presentation about a company, the earned media may include coverage of the presentation by a financial news program and discussion by financial experts on the program related to the information delivered at the presentation. As an additional type of performance data, inferred response metrics 150 relate to metrics that may be affected by the delivered presentation but may not be directly linked to the presentation (e.g., in earned media). For financial information, such inferred response metrics 150 may include the performance of a company's traded stock value during the presentation or within a particular timeframe of the presentation (e.g., if the market is closed during the presentation, the performance of the company in the following trading day). In other contexts, the inferred response metrics 150 may include a quantity of orders for a company's forthcoming product (which may have been discussed in the presentation), interactions with the company's webpage, and other information. The inferred response metrics 150 in some embodiments are metrics that are continuously available, such the effectiveness of the presentation may be measured by a relative increase or decrease of the measured value during or subsequent to the presentation.

The presentation assistance system 100 receives the presentation materials, relevant rehearsed presentation(s) 130, and may monitor the delivered presentation to develop the presentation, improve delivery in the rehearsal, and provide real-time feedback during delivery of the delivered presentation 140. When the presentation script 110 is being developed, for example, the presentation materials may be provided to the presentation assistance system 100 for evaluation with respect to selection of themes and terms that may improve performance data. In addition, the presentation assistance system 100 may predict external participants and expected questions from the participants, permitting the presentation materials and/or the presenter to be better prepared for the types of interactions that may occur. Similarly, the rehearsed presentation 130 may be analyzed for its delivery and the presenter's efficacy in delivering the presentation, automating presentation advice and delivery improvement for the presenter. During delivery of the presentation, the presentation assistance system 100 may also monitor the presentation along with the participants and developing script to provide real-time feedback during the presentation and guide effective delivery. These and additional features of the presentation assistance system 100 are further discussed below.

As one example for a presentation related to an earnings event, a user may create and upload a draft presentation script 110 to the presentation assistance system 100. The presentation assistance system 100 analyzes the script to determine various characteristics, such as its key information (such as a summary and key data points), its tone, and predicted questions (e.g., a type of interaction from an external participant) that may be asked by the audience. These may then be used to determine suggestions and other modifications of the script to improve its expected performance during the presentation. These characteristics may be determined by one or more computer models and may be further based on language model analysis in conjunction with historical presentation data, such as prior presentations of the company and/or presentations of similar companies (e.g., of a similar size, industry/field, or relating similar key information). As one example output, the presentation assistance system 100 may provide predicted questions, sentiment reports, and recommended modifications to the script. The user may revise the script based on the model analysis and may modify the presentation, for example, to better account for the predicted questions and incorporate suggested modifications. In some embodiments, the presentation assistance system suggests modifications to the presentation script 110 based on the predicted interactions, such that the script may directly account for expected questions and concerns. The various modifications may be automatically applied by the presentation assistance system 100 or may be suggested to the user for incorporation. Even where the predicted interactions are not directly incorporated into the presentation script 110, the predicted interactions and other analysis and predicted performance may nonetheless inform a user's preparation for the delivered presentation 140.

The user may send a new script with these adjustments and evaluated again. When the user is satisfied with the content of the presentation script, the user records a rehearsed presentation 130 as a pre-recording. This pre-recording is automatically evaluated as well, and with the audio and/or video of the presentation, additional information can be evaluated with the audio or video content including, for example, audio tone or body language. As with the presentation script 110, the user can re-record parts of the presentation and re-run the analysis. The user may then proceed to the live day for recording the delivered presentation 140. While the delivered presentation 140 is being recorded and distributed, the presentation assistance system 100 monitors the delivered presentation 140 to make real time recommendations that may be informed by the previous analysis of the presentation script 110, supplemental materials 120, and the rehearsed presentation 130. The presentation assistance system 100 may monitor the delivered presentation 140 for relevant events for which additional information may be generated and provided to the user to provide a "co-pilot" for the delivery of the presentation, enabling the user to quickly reference and incorporate information from the presentation assistance system 100. Such events may include an analyst (e.g., a particular external participant) joining the call, spoken topic, or other data triggers that may be used to update the advice from the presentation assistance system 100, for example to update predicted interactions and suggest responses (e.g., answers) for the user if the participant provides an interaction similar to a predicted interaction or related topic. When the user/presenter has freedom to select which external participants may participate, the predicted interactions, along with who makes them and the relative strength of the presenter's response (which may include the suggested response from the presentation assistance system 100), may also inform which external participants are selected to participate. The delivered presentation 140 may also be monitored for other characteristics such as tone, presentation style, etc., and feedback may be presented to the user to suggest modifications to the presentation style. The end user opts to prioritize certain analysts over others to better curate the questions they would like to take. As questions and answers are presented, predictions of the presentation assistance system 100 are updated and may account for keywords, phrases, or tones that may change the probability of a particular subsequent interaction (e.g., a particular type of follow-up). Finally, at the end of the presentation, the presentation assistance system 100 may generate further analysis of the completed presentation similar to the rehearsed presentation 130 and may then gather related performance data for storage with the delivered presentation 140. The final analytics may include an evaluation of the overall performance of the presenting user and include recommendations for improvement in subsequent presentations. As a result, the user developing and delivering the presentation can benefit from the model-generated analytics and advice from the user's preparation of the presentation script 110 to post-mortem delivery recommendations. As discussed below, the presentation assistance system 100 may generate effective advice and modifications to the preparation and delivery of the presentation with various computer models and analysis of prior presentations and their performance, enabling effective natural-language feedback to the user that enables the presentation assistance system 100 to analyze a variety of types of presentations in many dimensions, including flexibly predicting external participant interactions and providing natural-language approaches for addressing such interactions. Because the system may be incorporated in the generation of the script and its rehearsal, the presentation assistance system 100 may also predetermine many likely aspects of the live feedback (e.g., based on the key information, keywords, tone, predicted interactions, and so forth from the presentation script 110 analysis), reducing processing requirements and delays. Given the "live" nature of the presentation delivery and that underlying language models may be hosted externally and may also be computationally expensive to execute, such optimizations to reduce processing and timing enable sophisticated feedback and anticipation of the user's needs in a timeframe that may actually be used during the live presentation.

While the present disclosure generally relates to the automated assistance for evaluation and revision of investor relations presentations (such as earnings reports), the principles of the present disclosure apply generally to improving presentation of many different types of content that may be presented to different types of audiences and for which different audiences may be interested and for which different outcome metrics may be used. For example, the present disclosure may be applied to scientific, political, news, internal corporate presentations and other presentations that may include different supplemental material and different attendees. Such presentations may thus be presented to different audiences and may include different types of interactions and relate to different underlying substantive material. In general, these principles may be applied to presentations that may be analyzed and improved as discussed below. Each different type of presentation may have separate types of topics, participants, metrics for performance data, and so forth that vary in different embodiments.

Architecture Overview

Figure 2:
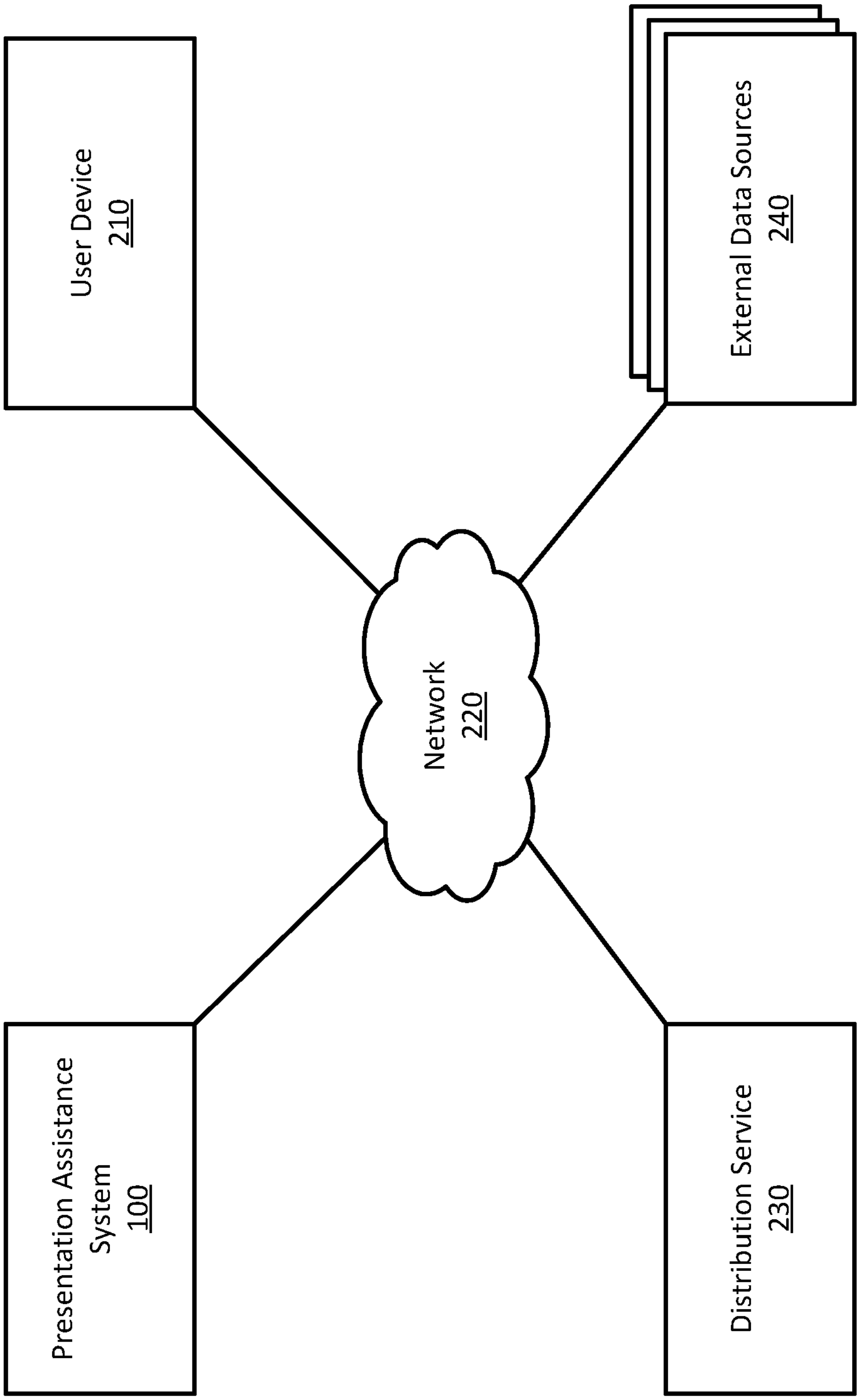
FIG. 2 illustrates a simplified system environment in which the presentation system may operate, according to one or more embodiments.

FIG. 2 illustrates a simplified system environment in which the presentation system 100 may operate, according to one or more embodiments. The environment of FIG. 2 shows the presentation assistance system 100 that communicates with various systems and devices via a network 220. The network 220 is a communications channel through which electronic systems communicate and may include various wired and wireless connections. A user device 210 is operated by a user preparing the presentation to be delivered. The user device 210 is a computing device operable by the user for interacting with the presentation assistance system 100 and performing other functions discussed herein. The user device 210 may be various form-factors and types of devices, such as a desktop, laptop, handheld or mobile device, and so forth.

In some examples multiple users may prepare the presentation and may each operate respective user devices 210. Similarly, in some cases multiple users may participate in the delivery of the presentation and may be different users than the users who prepared the presentation materials (e.g., the presentation script and any related supplemental materials). For convenience of explanation, a single user is generally discussed herein as preparing the presentation and as the user delivering the presentation; configurations in which multiple and/or different users may perform these operations generally operate similarly.

The presentation assistance system 100 operates in conjunction with the user device 210 to provide interfaces and other information to the user for interaction with the functionality of the presentation assistance system 100. The user may also develop the presentation materials on the user device 210 and provide the materials to the presentation assistance system 100, and in other embodiments the presentation assistance system 100 includes authoring services, which may be accessible by an application on the user device 210, which may be a special-purpose application associated with the presentation assistance system 100, or may be a browser or other application for receiving and executing received instructions from the presentation assistance system 100 for relevant interfaces with the user.

In general, the user device 210 also includes various types of recording devices, such as a microphone or camera for recording the user delivering the presentation. In other examples, the devices used for recording the presentation may be different from the device used to rehearse and/or deliver the presentation, or the presentation may be delivered at a podium or other environment in which the user device 210 used for providing information from the presentation assistance system 100 (e.g., real-time feedback on the delivered presentation) is not connected to the devices capturing the presentation for distribution. For convenience, the user device 210 is generally used herein to refer to the device that interacts with the presentation assistance system 100 to provide information and analysis to the user during development and delivery of the presentation (e.g., during the general process shown as shown in FIG. 1).

During rehearsal and delivery of the presentation, the user device 210 may also operate as a teleprompter or other device displaying the prepared script and any other cues to the user. In some embodiments, the real-time analysis of the delivered presentation is presented on the same interface as the prepared script; in other examples, this information is presented on a separate interface or display.

When the presentation is ready for delivery, the user may operate the user device 210 to communicate with a distribution service 230 for transmitting the captured presentation to relevant audiences. The distribution service 230 may vary in different embodiments, and may include, for example, teleconferencing, virtual meeting rooms, video conferencing, video distribution services (e.g., broadcast channels, network-distributed video, etc.) and so forth. The distribution service 230 may also coordinate audience participation, enabling the user delivering the presentation to permit other users to participate (e.g., external users), and may provide audience identification and verification services (e.g., to identify and verify the identity of particular audience participants). In addition to the delivered presentation, the distribution service 230 may also distribute related materials, such as accompanying materials to the presentation, which may include demonstratives or other exhibits directly displayed or referenced in the presentation or other supplemental material that may be relevant to understanding the presentation and that may be accessible and/or distributed to audience participants. The presentation assistance system 100 may register or otherwise subscribe to receive the delivered presentation from the distribution service 230 for processing and coordination of real-time information to the user device 210 to aid in the presentation. The presentation assistance system 100 may receive the delivered presentation in alternate ways; for example, the audio and/or visual content of the presentation may be routed through the presentation assistance system 100, such that the presentation assistance system 100 may initiate its analysis before forwarding the presentation content to the distribution service 230 for distribution. When the recorded presentation is complete, the presentation may be stored, e.g., by the distribution service 230 or the presentation assistance system 100 and may be further used to revise operation of the presentation assistance system 100 as further discussed below.

One or more external data sources 240 may be accessed by the presentation assistance system 100 to retrieve additional relevant information about current and/or historical presentations. For example, information used to define the performance data for the outcome of the presentation may be represented by data at the external data sources. Such information and the type of data sources may vary according to the particular type of performance data used by the presentation assistance system 100 and may also vary according to the type of presentation. For example, a scientific presentation may have data sources describing the number of accesses or inquiries to a presenting scientist's academic institution for additional details of a scientific study. In the financial context, the external data sources 240 may include information from financial markets, real-time discussion and analysis from analysts, relevant financial articles and media publications, and so forth. As discussed above, the performance metrics may generally represent "downstream" or other desired events that may be reasonably associated with the relative effectiveness of the presentation. The presentation assistance system 100 may also communicate with devices to determine real-time audience responses to the presentation, and may, for example, solicit portions of the audience to rate the presentation or receive real-time reactions, such as from interactive components of the presentation (e.g., a "chat" or other messaging component of the presentation that permits free-form or Boolean responses to the presentation), from messaging systems or forums in which relevant audiences may comment on the presentation and so forth.

The environment shown in FIG. 2 omits additional devices and systems for clarity and simplicity of description. For example, the distribution service 230 in some embodiments is incorporated in a system that also includes the presentation assistance system 100. In addition, the various types of channels through which the presentation is distributed and the devices or other components that receive and display the presentation to the audience are not shown or particular types of data sources that may include various types of communication systems or devices, such as broadcast media, electronic and physical distribution systems, social networks, newsfeed and newswire services, and so forth. Likewise, additional devices and systems are omitted for the various audiences and other users who may receive or otherwise access or engage with the presentation.

Figure 3:
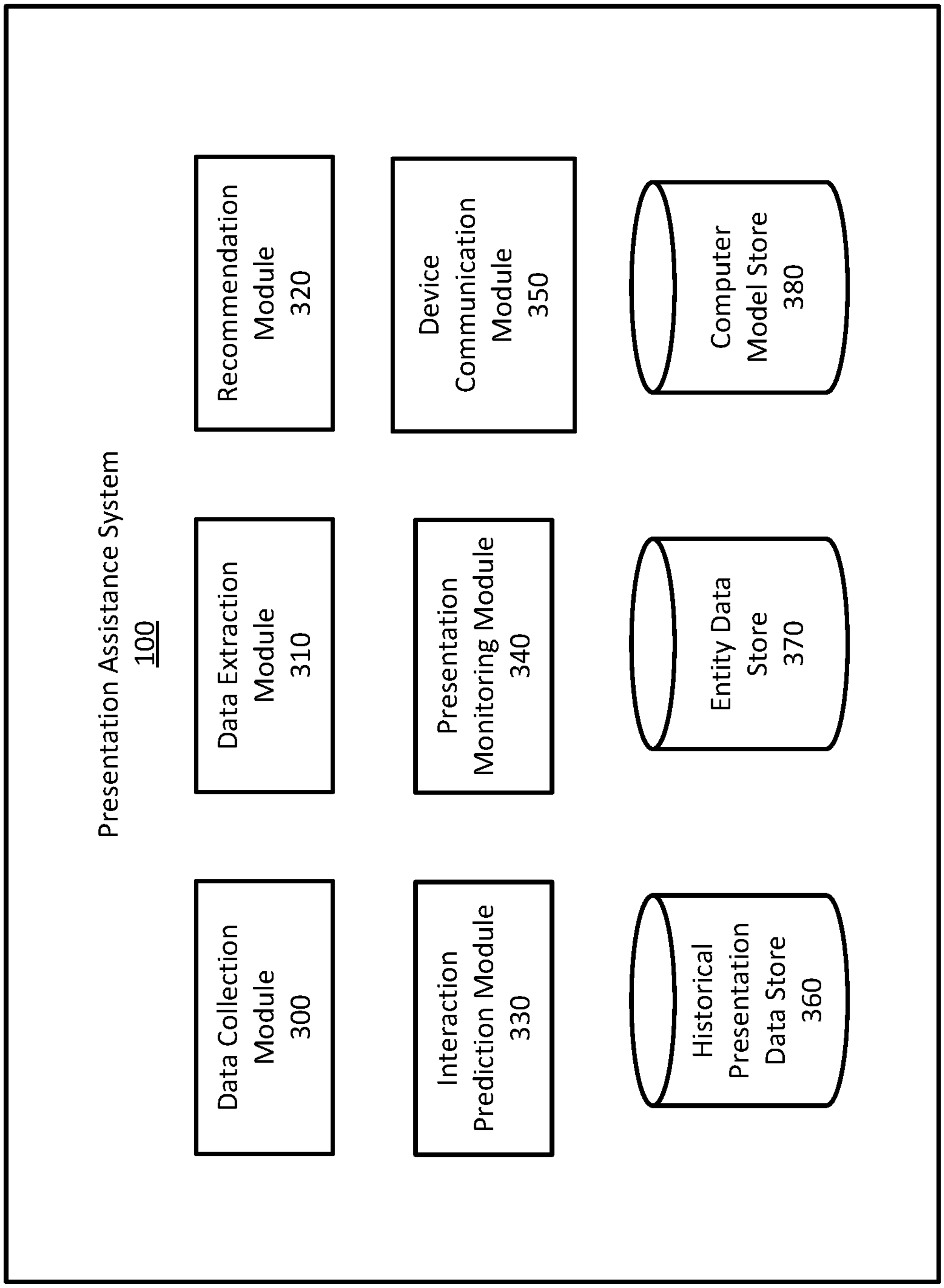
FIG. 3 shows example components of the presentation assistance system, according to one or more embodiments.

FIG. 3 shows example components of the presentation assistance system 100, according to one or more embodiments. In general, the presentation assistance system 100 collects presentation data and related performance data to train and apply various computer models for analyzing presentations and providing information and suggested modifications at the various stages of presentation preparation and delivery to improve performance based on the historical presentations and the related characteristics and performance. As such, the presentation assistance system 100 includes various data stores including a historical presentation data store 360, an entity data store 370, and a computer model store 380.

The historical presentation data store 360 stores information about prior presentations and related data related to performance of the presentations, attending participants, transcripts, and so forth. The historical presentations are analyzed to determine relevant types of additional content about the presentations depending on the various information used by the presentation assistance system 100. The historical presentations may be retrieved as they were originally presented, for example as audio and/or video. Additional data may be determined from the presentations and from other sources to supplement the information about the presentation in the historical presentation data store 360. The additional information represents a set of presentation characteristics that may be used to characterize the presentations for further analysis. For example, additional information may describe a transcript of the audio, related supplemental materials, key information related to the presentation, such as its topics and themes, the external participants and their related interactions, a tone of the presentation style, related performance data, and so forth as further discussed below. In general, the collection of this data and generation of additional information about the historical presentations may be used for generating relevant feedback and modifications to a current presentation. As such, in some embodiments the data in the historical presentation data store may be used as training data for one or more computer models that provide improvements to presentation scripts.

In many cases, the various historical presentations may also be associated with one or more entities (e.g., companies, universities, persons, organizations, etc.) that author or release the presentation. Information about the various entities may be stored in the entity data store 370. In some embodiments, multiple presentations may be associated with the same entity, such that similar information about the entity applies to several presentations. In additional examples, the entity information may be stored in association with the individual presentations, for example, to capture a "snapshot" of the entity with respect to the time of the presentation. When an entity's characteristics may vary over time, that entity information may be captured with respect to the presentation as the relevant entity information in one time period, such as a decade, year, quarter, or month, may differ from one to the next. As example entities whose information may be collected, when the presentation assistance system 100 relates to financial/earnings presentations, the entity may be the company whose financial information is being presented. In a scientific or medical setting, the entity may relate to the clinic, organization, laboratory, or other group that released the presentation.

While the historical presentations themselves may be associated with key information and other substantive "types" that may describe the content of the presentation, the entity information may reflect additional characteristics of the presentation that may more broadly be used to determine relatedness between presentations (e.g., when information about one presentation may apply to another). For example, external participants and their questions in many cases may be better predicted based on similarity of the entities rather than information that may be more immediately determined from information of the presentation itself. For example, entity information for a financial presentation may describe the corporate entity, its size, revenues, lines of business, board members, and other types of information. In many circumstances, while information about the script may be relevant to the interactions of participants, information about the relevant entities may be more effective when used by the computer models to predict external participants who may participate in the presentation. In the financial example, certain analysts may generally be interested in or assigned to particular types of companies, technologies, or other characteristics that may be more effective predicted with respect to the entities. In addition, in many cases the entity information may also describe at least one type of performance data. For financial earnings, performance data may include the performance of a related company's stock and its market value over time. As an additional example, the performance data may include the entity's performance relative to expectations, such as whether the company meets, exceeds, or underperforms the expectations. Such financial earnings in some embodiments may be stored in association with the entities in the entity data store 370.

The computing modules may use and/or train one or more computer models that may be stored in the computer model store 380. In general, a computer model learns a set of parameters for converting a set of inputs to a set of outputs. The structure of the parameters may differ according to the particular computer model and may include different types of machine learning computer models according to the particular task. In general, the learned parameters are used to describe a relationship for combining or otherwise modifying values of inputs to generate values of outputs. Such models may include various neural networks which may include a number of hidden layers that generate or operate upon intermediate values (i.e., other than the input and output) within the network. Depending on the implementation, models may include fully connected layers, convolutional layers, activation layers, pooling layers, recurrent layers, attention layers, and so forth. Also depending on the particular model and its implementation, the models may include sequence-sequence models, large language models (e.g., transformers), classification models, and so forth. The computer models may be trained by any suitable technique according to the type of data and may include supervised and unsupervised learning based on a set of training data.

Additional or fewer data stores and modules may also be included in presentation assistance system 100 and features or functionalities of them may be accessed at or stored by separate (e.g., remote) systems. For example, in some embodiments, the computer models are not stored at the presentation assistance system 100, in which case the computer models may be stored at a remote system and accessed by the presentation assistance system 100. The presentation assistance system 100 in these embodiments may provide information for training (or fine-tuning) the models and may send requests to the external systems for accessing and applying the models. As such, "training" the model may include sending data to another system that performs the training based on provided training data, and similarly using a model may include sending input data to another system for training the model.

The data collection module 300 gathers relevant data for further analysis. The data collection module 300 accesses data sources, such as external data sources 240, to retrieve historical presentations, related performance data, entity information, and so forth. In addition to the presentation data, the data collection module 300 may also retrieve relevant supplemental information that may vary according to the particular type of presentation analyzed by the presentation assistance system 100. In the financial presentation context, the various data sources that may be accessed by the presentation assistance system 100 may include earnings webcasts or conference calls (e.g., the related audio/video or a transcript thereof), earnings press releases, regulatory filings, available financial data, and entity data. The related data collection may be provided to a data extraction module 310 for further analysis of the presentation information.

The data extraction module 310 parses presentation information to generate a set of additional information about the presentations for further analysis. The data extraction module 310 may use a variety of computer models and processes for extracting additional information from the presentations that describe various presentation characteristics of the presentation. In general, the data extraction module 310 generates descriptive information about a presentation, which may include historical presentations, or a current presentation being prepared and/or delivered. For historical presentations, this additional information may be stored in association with the relevant presentation in the historical presentation data store 360. For presentations currently being revised and presented, the presentation characteristics describing the presentation are provided to a recommendation module 320, discussed below, that employs the extracted data to generate recommendations for modifying the presentation. As such, the data extraction module 310 may generate descriptive information about the presentation, such as whether the presentation of disappointing information has a defensive, groveling, or open tone; similarly, the recommendation module 320 may generate recommendations for how a presentation may be improved, such as whether the presentation would benefit from an open tone instead of an identified defensive tone, and terms that may be revised in the script to effect that change in tone. Though described here as discrete modules, in practice, these may be performed by a single module; for example, certain functions and analysis performed by the data extraction module 310 may be used by the recommendation module 320 in generating recommendations and modifications to a script that may affect the interpretations generated by the respective processes of the data extraction module 310.

The data extraction module 310 may perform various functions in analyzing a presentation, which may be applied to historical presentations as well as a currently evaluated presentation. First, for presentations, such as historical presentations that do not presently have a transcript, the data extraction module 310 may process the presentation to generate a transcript, for example, with automated voice-to-text analysis of the presentation. The transcript may also be annotated to identify speakers in the transcript, such as whether the speakers are one of the presenters or an external participant. The speaker identification may also be determined with the audio and/or video based on voice analysis or other identification of change-of-speaker. In many cases, speaker information may also be available or determined from the presentation (e.g., based on a speaker identifying themselves in the presentation). The identified participants thus provides accurate attribution for statements in the transcript. Additional information about the participants may also be determined, for example, to determine the participants' relationship to the presentation (e.g., a presenter or a particular type of external participant). Determining individual identification and their credentials/associations also enables participants to be associated with presentations across time and with the particular ways in which participants may participate.

The presentation may also be analyzed to determine different portions of the transcript relating to different types or portions of the presentation such as opening remarks, transitions between portions, and so forth. In particular, transition between different types of speakers and identification of questions or other interactions posed by external participants is used to identify the segments of the presentation including external interactions and the related speakers. As such, in the financial presentation examples, the data extraction module 310 extracts questions and answers from the presentation (such as an earnings call) and accurately attributes them to the respective speakers (e.g., investors, analysts, or company executives).

The presentation assistance system 100 performs sentiment analysis on the overall call, individual questions, and answers to gauge the tone and sentiment of the discussions. The sentiment analysis may also be referred to as a tone analysis. The sentiment analysis may be performed in different ways in different embodiments. In some embodiments, the sentiment may be determined based on a group of possible sentiments or another taxonomy and may be determined based on terms or other language from the transcript matching terms or other information about the sentiment. As another approach, word and/or sentiment embeddings may be used that represent the respective words and sentiments, such that the similarity between word embeddings the possible sentiments may be determined by comparing the word and sentiment embeddings. In other embodiments, a language model may be used that receives a segment to characterize and a prompt generated that prompts the language model with the task of determining the most likely sentiments or tones identified in the transcript. The results from the language model (e.g., such as the top N identified sentiments) may then be selected as the tone describing the segment.

In addition, tone and sentiment analysis may be performed with voice and/or body language analysis of the related audio/video of the presentation. The voice and/or body language analysis may be used to label expressed emotions and associate the tone with respective portions of the transcript. This analysis may compare, for example, a user's voice modulation, variation, cadence, and so forth and evaluated with respect to samples or other labeled data. Similarly, a presenter's facial expressions may be analyzed with respect to identified facial points or with other approaches to determine whether the user has expressed expressions such as happiness, sadness, surprise, and so forth. Likewise, body language and/or hand movements may also be analyzed to determine a level of movement, posture, and other indicators that may represent confidence or other characteristics. These may also be automatically evaluated with respect to best practices and other labeled information related to preferred performance information. For example, a user's hand gestures and other body movement may be evaluated and determined to represent a level of movement such as low, medium, or high.

Further analysis of the presentation style may include analysis of speaking speed (e.g., spoken words per minute), sentence length, pitch variation, pronunciation (which may be characterized as a particular dialect), and average sentence length. These may be determined by analysis of the audio presentation in conjunction with a generated transcript. For example, time-stamp comparison of the words in the transcript may be used to determine a number of works per minute and speaking length. Pronunciation may be evaluated by comparing words to a dictionary of word pronunciations, which may be associated with different regional variations as dialects, or by determining the particular produced sound relative to a planned script to determine how different sounds may be made by the speaker. The pronunciations across the transcript may then be summarized to describe the dialect for the presentation as a whole. These presentation styles may also be evaluated relative to a baseline (e.g., a preferred number of words per minute or a "standard" accent for the presentation) to determine metrics describing comparative variation of the presentation style relative to the baseline.

The data extraction module 310 may also be used to analyze the presentation for various types of key information, which generally relate to substantive information about the presentation as presented. The key information may include information such as key points or individual data points of the presentation, overall themes, and a summary of the presentation (or parts thereof) as a whole. The key points may reflect individual facts or pieces of information conveyed by the presentation, while the themes may represent individual categories of information or topics addressed in the presentation. For example, a presenter in the presentation may describe a key point that a company's revenue was $105 M and expected revenue was $100 M. One identified theme may be "outperformed expectations" while a summary may include this and other information from the presentation as a whole. The extraction of these various types of key information may be performed in various ways and may utilize one or more computer models. As one example embodiment, a language model may be prompted with particular types of key information and the relevant portion of the presentation. For example, a prompt for the language model may be constructed requesting the language model to generate a summary of the text that follows or to identify the most significant facts in the following segment. In some embodiments, the language model for these tasks may also be trained (e.g., fine-tuned) based on labeled data for the particular type of presentation. For example, many financial presentations may have similar types of information, such as presentations about revenue in different business lines, how performance compares to predictions, upcoming projects and other developments and so forth. By training the model with respect to labeled data related to these categories, the model may more effectively identify these aspects in portions of a current presentation.

The extraction of key information may also be applied to interactions with external participants and with the supplemental information related to the presentation. As such, the topics and other key information presented by an external participant may be identified and distinguished from the information presented in the presentation itself.

To generate the summary, in addition to the transcript, the data extraction module 310 may also use other generated information about the presentation, such as determined tone, themes, labeled participants and other annotations of the presentation and its parts, and so forth. This may enable the summary to more fully integrate these additional characteristics to into the analysis of the presentation as a whole. Particularly, by determining individual speakers and speaker identities, the automatic summary may be able to identify, for example, aspects of the respective back-and-forth of the presenter and the external participants.

In sum, the data extraction module 310 is trained to recognize and analyze presentations to recognize relevant information (to the type of presentation), including speaker identification and sentiment analysis. As such, the data extraction module generates a comprehensive database of call summaries, facts, and investor analysts in the historical presentation data store 360 and may also be applied to analyze present presentations. In the financial analysis example, this permits the data extraction module 310 to automatically process and analyze presentations and generate characterizations for further analysis and to power relevant recommendations.

The recommendation module 320 generates the various types of recommendations and modifications to a script and the presentation as discussed with respect to FIG. 1. For example, the recommendation module 320 may recommend modifications to planned remarks along with modifications to the particular way in which a presenter delivered it. As such, the recommendation module may operate as a communication and body language coach that scans an individual's recorded videos and transcriptions to analyse their message for improvements. Such improvements may emphasize revisions to the tone, such as increased positivity, and presentation characteristics, such as clarity and appropriate body language, providing constructive feedback to improve their overall communication skills.

The particular recommendations determined by the recommendation module 320 may be based on the particular phase of the presentation development. During script preparation, the recommendations may focus on modifications to the content of the script itself, while during rehearsal the recommendations may focus more directly on the presentation delivery by the user. To provide suggested improvements for a preparation being prepared, as a general approach, the script may be analyzed to determine the current interpretations of the script. Modifications of the script may be determined based on the script and its interpretations and optionally in view of a "target" or "desired" interpretation of the script to provide a comparison relative to the current interpretation. In some configurations and with some types of interpretations, the interpretation may be provided to the user without suggested modification. The recommendation module 320 may provide recommendations and analysis with respect to many different aspects of the presentation as discussed below.

As one type of recommendation, the recommendation module 320 may provide recommendations related to key information determined for the script, such as the topic, themes, and summary. The prepared script is provided to the data extraction module 310 to determine the current analysis of the presentation with respect to this information. The resulting key information may then be provided to the user to view the automated analysis of the script. To determine suggested revisions for the key information, preferred information about the key information may be determined, for example based on user revision of the key information or based on a comparison of the key information determined from the script to the key information determined from other supplemental data related to the presentation. For example, in the financial presentation example, related supplemental information may include earnings reports and regulatory filings, such that the presentation is intended to generally be consistent with the supplemental information. When the analysis of the presentation script results in key information that significantly differs from the supplemental information, the discrepancy may be provided to the user. In addition, the system may automatically suggest revisions to the script to change the interpretation towards the desired result. For example, an input may be provided to the language model with the desired direction for modifying the key information and the language model prompted to propose modifications to the script that affect those changes to the summary. The efficacy of the modifications may also be verified by inputting the modified script to the key information analysis model(s) to determine whether the modified script is improved towards the desired target. As many presentations and other public information may be consumed by automated systems that may use such language models for performing similar summaries, generating recommendations based on these models may include the likelihood that the presentation successfully conveys the desired information when processed by recipients who apply such models.

Similarly, the recommendation module 320 may also propose modifications to the script based on determined tone and for the presentation. After determining a tone for the script by applying the relevant model via the data extraction module 310, the recommendation module 320 may provide the resulting tone to the user and generate suggestions for modifying the tone of the presentation. To do so, a desired tone of the presentation may be determined, for example, based on a selection by the user (e.g., as a profile of the user or selected in response to the currently-evaluated tone of the script) or as specified by an entity associated with presentation (e.g., specified in a style guide). Additionally, the desired tone may also be determined based onpresentations in the historical presentation data store 360, such as prior presentations associated with the entity or by a particular presenter. To generate modifications to the script, the terms and other language in the script may be analyzed to determine the terms that associate the script with the existing tone (e.g., the tone to be reduced) and terms associated with the tone to be emphasized. When a tone is determined based on a list or other specific terminology, terms associated with the tone to be removed may be identified in the script and terms associated with the tone to be increased are retrieved. As another example, the relevant terms may also be determined based on embeddings or other representations of the terms and tones, such that similarity between term and tone embeddings may be used to determine relevant terms to the desired tone.

The terms associated with the tones (e.g., to be removed or to be added) may then be used to generate modifications of the script that incorporate fewer of the terms associated the tone to be reduced and more of the terms associated with the tone to be increased. As an alternative, example portions of historical presentations may also be selected that exhibit the desired tones, and portions of the historical that are associated with that tone may be identified for use with the current script. As one example, the recommended modifications may be generated by providing the preferred and dispreffered tones to a language model along with the relevant portions of the presentation script and a prompt requesting the language model propose a rewrite to relatively increase the preferred terms and reduce the dispreferred terms. As a result, the model may automatically generate natural language modifications to the existing script. In further examples, certain terms associated with different tones may be associated terms that are interchangeable, such that the tone may be changed by replacing a term with the related term having a different tone.

The recommendation module 320 may also make recommendations based on performance metrics of historical presentations. As one example, the recommendation module 320 may use interpretations of the script to identify relevant historical presentations, identify the respective performance of them, and identify terms that were relatively used by those presentations that increase or decrease the performance metrics. For example, the identified themes, topics, or other key information of the presentation may be used to identify previous presentations having the same or similar themes and topics. The text of these presentations may be analyzed to determine the respective performance and association of terms in the presentations with the effect on performance. A presentation identified as relating to poor financial results, for example, may have an identified theme of "underperforming relative to expectation" and used to identify historical presentations that are labeled with the same theme. Those presentations may then be analyzed with respect to the term and performance metrics to determine (as an example) that a term "catastrophic" is associated with very negative performance relative to a term "disappointing" in the historical presentations. The relatively high- and low-performing terms may then be identified as terms to encourage or discourage in the script. Modifications to the script based on these preferred terms may then be determined as just discussed with respect to terms associated with tone. As such, the performance metrics and related term analysis and incorporation with the use of models to automatically generate modifications of the script enables sophisticated and automated revisions to the presentation to improve its performance.

As another example, recommendations may be generated based on predicted interactions (e.g., questions) that may be provided by external participants during the presentation. As discussed below, with respect to an interaction prediction module 330, a set of predicted interactions may be generated for the presentation, for example based on the predicted participants or the topic, and so forth. The recommendation module 320 may use the predicted interactions (e.g., a question) to automatically generate responsive information (e.g., an answer) to the predicted questions and/or modifications of the presentation script that incorporate such a response. These answers may be generated based on the script as well as supplemental information and other data sources for the presentation. For example, the draft presentation may focus on certain information in a supplemental companion document that is not presently in the presentation script. When a predicted interaction relates to that information, because the supplemental document is associated with the presentation, it may be automatically included in the data available to generate an answer to the predicted question. As one way to generate the answer to a predicted question, the question, script, and any relevant supplemental information may be provided to a language model with a prompt to generate an answer to the question based on the relevant information, such that the resulting output from the language model may represent natural-language responses to the question.

In further configurations, the associated responses to an external participant's interaction may be generated in part based on historical presentations having similar interactions. For example, the predicted interaction may be used as a query to the historical presentation data store 360 to identify similar interactions and the associated responses in the historical presentations. Prior responses may be particularly relevant, for example, when the appropriate response may be non-substantive or not included in the script or supplemental materials. For example, certain types of questions may often be deflected or not answered by a presenter. By considering responses to similar interactions in the historical presentations, this type of response can also effectively be considered by the language model in generating responses that may not be apparent from analysis of the presentation script or from other analysis of presentation information.

To generate modifications to the script based on the predicted interaction (e.g., the predicted question), the script and the generated answer (which may be further modified by the user) is provided to the language model with a prompt to generate revisions to the script that incorporate information related to the generated answer. As such, simply from the provided script, the recommendation module 320 in conjunction with the interaction prediction module 330 automatically predict interactions and may automatically generate responses to them, enabling the intelligent modification of the presentation in anticipation of external participant interactions.

In addition to the revisions to the script, the recommendation module 320 may also provide feedback and recommendations based on presentation style, such as body language, speaking style, and non-verbal cues (e.g., hand gestures). When a user rehearses a presentation or delivers a live presentation, the presentation audio and video may be provided to the data extraction module 310 to determine the presentation style according to different dimensions (e.g., body language, facial expressions, etc.) as discussed above. Similar to the tone recommendations discussed above, recommendations for the presentation style may be based on a preferred style of an entity, a style guide, may be based on user-selected preferences, or determined from effective historical presentations. Suggestions for modifying the user's tone and presentation style may then be displayed to the user and real-time applications may be provided to the user during the presentation to provide real-time suggestions to correct the presentation style during the presentation. For example, the speed of a user's presentation (e.g., words per minute) may be compared to a preferred style to suggest a user increase or decrease the user's speaking speed at particular points of the presentation.

The recommendation module 320 may also analyze the quality of the presentation as a whole (which may include processing of the other types of data generated by the data extraction module) to provide an overall presentation scoring. In some embodiments, the presentation scoring may also be performed by the data extraction module 310 and applied to historical presentations. The scoring may be based on various factors, such as the tone, industry best practices, alignment between the presentation style and a desired style, and so forth. For example, an on-topic script (e.g., alignment between topics and summary of the presentation relative to related or supporting supplemental documents), delivered professionally, that answers investor questions and presents maintains a desired tone (e.g., for a financial presentation, positive tone for the entity, while for a scientific presentation a neutral tone may be preferred) would be given a higher overall score. Scores can be provided for each metric individually, or in combination as a combined grade. As such, the scoring may be performed in a variety of ways in different embodiments and generally may provide a quick assessment of the presentation that a user may apply to evaluate the user's performance as well as track changes to the score over time (e.g., as the user repeatedly delivers presentations). In general, following the modifications and various recommendation types from the recommendation module 320 also increase the assessed score. The score thus provides a direct understandable summary feedback to end users that they can utilize to assess their relative improvement over time.

As a result, the recommendation module 320 identifies areas of improvement and provides specific feedback on the presentation, such as tone, word choice, and phrasing. The recommendation module 320 also analyzes the user's body language, including facial expressions, hand gestures, and posture, to ensure it is aligned with the desired message and does not convey undesired signals. The recommendation module 320 may consolidate the various types of recommendations into a comprehensive report highlighting the strengths and areas for improvement in the user's communication, providing actionable suggestions and in many cases automatically generating modifications to the presentation to implement them. Thus, the recommendation module 320 enables automated analysis and feedback in the particular context of the information being presented and its efficacy with respect to other relevant presentations (e.g., of similar entities or with respect to similar topics) and in view of predicted interactions and effective responses to them. This provides users with unbiased, data-driven feedback on their communication and body language, thus enabling users to enhance their communication skills and leading to more effective presentations tailored to the particular presentation topic, audience, and desired performance delivery style. By focusing on positive messaging and eliminating negative body language, users can foster stronger connections and better relationships with their audience.

The interaction prediction module 330 generates predicted interactions (e.g., questions) that may occur during the presentation. The interactions may be used by the recommendation module 320 to generate responses to the predicted questions or displayed to the user for the user to consider effective responses. The interaction prediction module 330 uses the database of interactions of the historical presentation data store 360 to generate predicted interactions that may occur based on the content of the presentation and/or the expected audience.

To do so, the interaction prediction module 330 may determine the key information of the script, such as via the data extraction module 310. This may identify relevant key points, themes, and other information that may be used to determine relevant interactions for historical presentations. The interaction prediction module 330 then accesses the historical presentation data store 360 to select example interactions based on relevance to the identified key information. In addition, the interaction prediction module 330 may also use entity information, for example, to identify related entities for the current presentation and identifies related presentations by related companies (e.g., based on characteristics of the entity). As one example, for financial presentations, the entity characteristics may describe the entity as a mid-size company in a particular technology area, such that other mid-sized companies in that technology area may be used to select relevant interactions from historical presentations.

As another example, relevant interactions may also be determined based on predicted participants to the presentation, as in some cases the particular types of interactions may be related to the external participant. The expected participants may be predicted based on previous participation with presentations in the subject matter, for the presenter, or for the entity. For example, an analyst with a particular expertise may be predicted to attend a presentation related to that expertise.

In general, the various types of information about the presentation used for selecting relevant interactions from historical presentations may be referred to as presentation metadata, and may include a summary of the presentation, themes, the entity, key information, predicted participants, and so forth. The relevant prior interactions from external participants are retrieved from the historical presentation data store 360 based on this presentation metadata.

Consequently, the system uses natural language processing and machine learning algorithms to generate questions (i.e., interactions) that are likely to be presented during the presentation, based on the script's content and the relevant interaction examples. The system then provides a list of the generated interactions and potential responses, allowing the end users to better prepare for potential inquiries and develop well-informed responses. In one embodiment, the system uses a language model (e.g., a "large" language model) that may "hallucinate" and generate terms and sequences different from its inputs and the training data. These "hallucination" effects may be used to gamify the predicted interactions and emulate randomness of human articulation by permitting additional variation to the generated predictions and interactions. To prevent these results from excessively deviating from the present presentation, the tone and topic of the result may also be determined to filter the model outputs with respect to the presentation. The users may then review the list of generated interactions and use them to guide the preparation for the earnings call and address any potential concerns or gaps in their script and can re-run the entire cycle again until no further improvements are suggested.

A presentation monitoring module 340 coordinates analysis by the presentation assistance system 100 with a real-time presentation. The presentation monitoring module 340 may receive a feed of a presentation (e.g., its audio/video) and provide the feed for real-time analysis. The real-time analysis may include determining a transcript from the delivered presentation and monitoring delivery style in speech and body language. The presentation monitoring module 340 may obtain identified terms, topics, tone, body language, etc., from the data extraction module 310 and related recommendations from the recommendation module 320 as the presentation is delivered. The identified characteristics (e.g., tone, body language, etc.) and relevant recommendations may be displayed to the user to permit adjustments by the user during the presentation. In some cases, the recommendations sent to the user may be filtered or narrowly selected to identify recommendations with relatively high-priority as the user's attention may already be focused on delivering the presentation.

In addition, the presentation monitoring module 340 may monitor external participants in the presentation to anticipate potential interactions and may identify when a participant provides an interaction. The predicted interactions for the presentation and potential responses as generated by the interaction prediction module 330 and the recommendation module 320 may be accessed by the presentation monitoring module 340 to determine when a participant matching a predicted interaction is present and if an interaction identified in the ongoing presentation is similar to or matches one of the predicted interactions. The identified interaction may be analyzed according to its topic, summary, terms, and other information to determine similarity with the predicted interactions, such that highly-similar predicted interactions are identified and may be presented to the user in real-time along with the prepared responses. These relevant predicted interactions may be presented to the user on a display with the responses such that the user may determine whether the responses that were determined when preparing the presentation may be relevant or useful in responding to the actually-presented interaction. As another example, the actually-presented interaction may be processed by the recommendation module 320 similar to the processing of the predicted interactions discussed above and enable on-the-fly generation of a response based on the presentation and the associated supplemental materials that may be displayed to the user in real-time and used by the user to craft the response. As such, the presentation monitoring module 340 may assist in both interaction handling by the user and in adjusting tone, sentiment, and other aspects of presentation style during the presentation. Because the generated recommendations may also be based on the related performance of historical presentations, these recommendations enable on-the-fly performance improvement that is calibrated with natural-language interpretations of effective presentations.

Finally, a device communication module 350 coordinates information exchange with the user device, sending and receiving relevant information to the user. The device communication module 350 thus may receive presentation materials from the user, provide the presentation materials to the data extraction module 310 and recommendation module 320 and coordinate display of the analysis and recommended responses to the user on the user's display.

The device communication module 350 may also provide for various visualization and analysis tools for the user to explore and evaluate presentations, such at the user's prior presentations and the presentations of the historical presentation data store 360. The user may search for and review presentations and retrieve presentations of interest. Users may access and search the historical presentation data store 360 to gain insights into presentation performance, related performance data, audience response, explore trends in participant interactions, and so forth. In addition, when a presentation is complete, users may receive post-call presentation analytics (e.g., final analysis from the data extraction module 310 and recommendations from the recommendation module 320 for further revisions, particularly to a user's presentation style).

Together, the presentation assistance system 100 provides a valuable database of presentation summaries, key information, interactions (e.g., question/answers), and related external participants. The computer model-powered system also reduces time and effort for other consumers of presentation information by automating and organizing the transcription, analysis, and summarization of earnings calls. Accurate speaker attribution ensures that interactions are correctly associated with the relevant individuals, providing better context and understanding of the presentation dynamics. Sentiment/tone analysis helps users gauge the overall tone and sentiment of the calls, enabling them to identify potential opportunities or risks based on participant perception of broader trends. The content grading helps assess the relative quality of a given presentation and provide comparative feedback and be used to assess relative change over time.

As a result, the user is better prepared for the presentation and can incorporate suggestions, in natural language, based on effective presentations relating to similar conditions, intelligently tailored the presentation to the current situation and with anticipation of potential interactions based on their script and context-specific interaction examples. The predicted interactions can be used to refine presentation scripts and ensure a comprehensive and coherent presentation of the relevant underlying information. In addition, the use of industry-specific Q&A examples allows for more accurate and relevant question generation, as the system can identify trends and common inquiries within the industry. Finally, the system can help end users build confidence in their ability to handle questions during earnings calls, reducing stress and uncertainty for presenters.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:

receiving a prepared set of presentation materials for an interactive presentation to an audience, the prepared set of presentation materials including a planned script;

determining a set of presentation characteristics with one or more language models, the set of presentation characteristics including a set of key points of the planned script and a topic of the planned script;

identifying a set of reference external interactions from a set of other presentations stored in a historical presentation data store based on the set of presentation characteristics, wherein the set of reference external interactions comprises text of questions posed by external participants during the set of other presentations;

generating a prompt to a language model, the prompt comprising the text of the questions of the set of reference external interactions;

determining a set of predicted external interactions for the interactive presentation based on an output of the language model responsive to the prompt;

filtering the output of the language model by determining a tone and a topic of the output and excluding from the set of predicted external interactions an interaction for which the determined tone or the determined topic deviates from the interactive presentation;

determining one or more modifications to the planned script based on at least one of the set of predicted external interactions; and providing the one or more modifications to a user device for display to a user.

2. The method of claim 1, further comprising automatically modifying the planned script with the one or more modifications.

3. The method of claim 1, further comprising determining a predicted participant based on a set of presentation metadata; and wherein determining the set of predicted external interactions is further based on the predicted participant.

4. The method of claim 3, wherein the set of presentation metadata includes a summary of key points of the presentation materials and the set of reference external interactions is determined based in part on the summary of key points.

5. The method of claim 1, further comprising:

receiving a rehearsed presentation of the presentation; and automatically determining one or more characteristics of a presentation delivery based on the rehearsed presentation.

6. The method of claim 1, further comprising:

applying the one or more language models to determine a summary of a set of supplemental materials in the prepared set of presentation materials; and determining one or more further modifications to the planned script based on the summary.

7. The method of claim 1, further comprising:

generating a modified planned script by applying the one or more modifications to the planned script; and verifying the one or more modifications by inputting the modified planned script to the one or more language models to determine an updated set of key points of the modified planned script.

8. The method of claim 1, further comprising:

receiving an interaction from an external participant during the interactive presentation.

9. One or more non-transitory computer-readable media having instructions executable by one or more processors for:

receiving a prepared set of presentation materials for an interactive presentation to an audience, the prepared set of presentation materials including a planned script;

determining a set of presentation characteristics with one or more language models, the set of presentation characteristics including a set of key points of the planned script and a topic of the planned script;

identifying a set of reference external interactions from a set of other presentations stored in a historical presentation data store based on the set of presentation characteristics, wherein the set of reference external interactions comprises text of questions posed by external participants during the set of other presentations;

generating a prompt to a language model, the prompt comprising the text of the questions of the set of reference external interactions;

determining a set of predicted external interactions for the interactive presentation based on an output of the language model responsive to the prompt;

filtering the output of the language model by determining a tone and a topic of the output and excluding from the set of predicted external interactions an interaction for which the determined tone or the determined topic deviates from the interactive presentation;

determining one or more modifications to the planned script based on at least one of the set of predicted external interactions; and providing the one or more modifications to a user device for display to a user.

10. The non-transitory computer-readable media of claim 9, wherein the instructions are further executable for automatically modifying the planned script with the one or more modifications.

11. The non-transitory computer-readable media of claim 9, wherein the instructions are further executable for determining a predicted participant based on a set of presentation metadata; and wherein determining the set of predicted external interactions is further based on the predicted participant.

12. The non-transitory computer-readable media of claim 9, wherein the set of presentation metadata includes a summary of key points of the presentation materials and the set of reference external interactions is determined based in part on the summary of key points.

13. The non-transitory computer-readable media of claim 9, wherein the instructions are further executable for:

receiving a rehearsed presentation of the presentation; and automatically determining one or more characteristics of a presentation delivery based on the rehearsed presentation.

14. The non-transitory computer-readable media of claim 9, wherein the instructions are further executable for:

applying the one or more language models to determine a summary of a set of supplemental materials in the prepared set of presentation materials; and determining one or more further modifications to the planned script based on the summary.

15. A computing system comprising:

one or more processors; and one or more computer-readable media having instructions executable by the one or more processors for:

receiving a prepared set of presentation materials for an interactive presentation to an audience, the prepared set of presentation materials including a planned script;

determining a set of presentation characteristics with one or more language models, the set of presentation characteristics including a set of key points of the planned script and a topic of the planned script;

identifying a set of reference external interactions from a set of other presentations stored in a historical presentation data store based on the set of presentation characteristics, wherein the set of reference external interactions comprises text of questions posed by external participants during the set of other presentations;

generating a prompt to a language model, the prompt comprising the text of the questions of the set of reference external interactions;

determining a set of predicted external interactions for the interactive presentation based on an output of the language model responsive to the prompt;

filtering the output of the language model by determining a tone and a topic of the output and excluding from the set of predicted external interactions an interaction for which the determined tone or the determined topic deviates from the interactive presentation;

determining one or more modifications to the planned script based on at least one of the set of predicted external interactions; and providing the one or more modifications to a user device for display to a user.

16. The computing system of claim 15, wherein the instructions are further executable for: automatically modifying the planned script with the one or more modifications.

17. The computing system of claim 15, wherein the instructions are further executable for:

determining a predicted participant based on a set of presentation metadata; and wherein determining the set of predicted external interactions is further based on the predicted participant.

18. The computing system of claim 17, wherein the set of presentation metadata includes a summary of key points of the presentation materials and the set of reference external interactions is determined based in part on the summary of key points.

19. The computing system of claim 15, wherein the instructions are further executable for:

receiving a rehearsed presentation of the presentation; and automatically determining one or more characteristics of a presentation delivery based on the rehearsed presentation.

20. The computing system of claim 15, wherein the instructions are further executable for:

applying the one or more language models to determine a summary of a set of supplemental materials in the prepared set of presentation materials; and determining one or more further modifications to the planned script based on the summary.

* * * * *